United States Patent [19]

Allen

[11] Patent Number: 5,174,320
[45] Date of Patent: Dec. 29, 1992

[54] BULK CEMENT METERING DEVICE

[75] Inventor: Thomas E. Allen, Comanche, Okla.

[73] Assignee: Halliburton Company, Duncan, Okla.

[21] Appl. No.: 816,474

[22] Filed: Jan. 3, 1992

[51] Int. Cl.⁵ .......................... F16K 3/26; F16K 5/10; F16K 5/04

[52] U.S. Cl. ........................................ 137/1; 406/192; 251/205; 251/209; 251/325; 251/310; 137/556

[58] Field of Search ........................ 251/209, 205, 325; 406/83, 195, 192; 137/1, 556

[56] References Cited

U.S. PATENT DOCUMENTS

| | | |
|---|---|---|
| 613,041 | 10/1898 | Kamerer . |
| 711,609 | 10/1902 | Woodnall . |
| 1,868,811 | 7/1932 | Yarnall . |
| 3,355,220 | 11/1967 | Brown ................................. 406/192 |
| 3,409,270 | 11/1968 | Hulsey ................................. 251/209 |
| 3,437,311 | 4/1969 | Schaible et al. . |
| 3,558,100 | 1/1971 | Hulsey ............................. 251/209 X |
| 4,249,839 | 2/1981 | Vance ............................. 406/192 X |
| 4,500,070 | 2/1985 | Riollet et al. . |

OTHER PUBLICATIONS

BJ Services Brochure No. 9/90 10M 1048 entitled "RAM Cementing Technology Land/Offshore" (undated but admitted to be prior art).

Dowell Schlumberger Brochure TSL-5016 entitled "VIP Mixer Total Control Of Cement Mixing" (undated but admitted to be prior art).

Primary Examiner—Arnold Rosenthal
Attorney, Agent, or Firm—James R. Duzan; Lucian Wayne Beavers

[57] ABSTRACT

An improved bulk cement metering apparatus includes a valve housing having a cylindrical inner housing bore. The housing has an inlet opening through a side wall thereof. A housing outlet is defined at an open lower end of the cylindrical valve housing. A cylindrical valve element is concentrically and rotatably received within the housing bore. The valve element is rotatable relative to the valve housing between a first fully closed position and a second fully open position. In the closed position the valve element completely blocks the inlet opening. In the open position the inlet opening is completely open. As the valve element rotates from its closed position to its open position a circumferentially extending cutout means thereof progressively uncovers an increasing upper portion of the inlet opening. This design results in decreased plugging of the metering device at low flow rates.

16 Claims, 4 Drawing Sheets

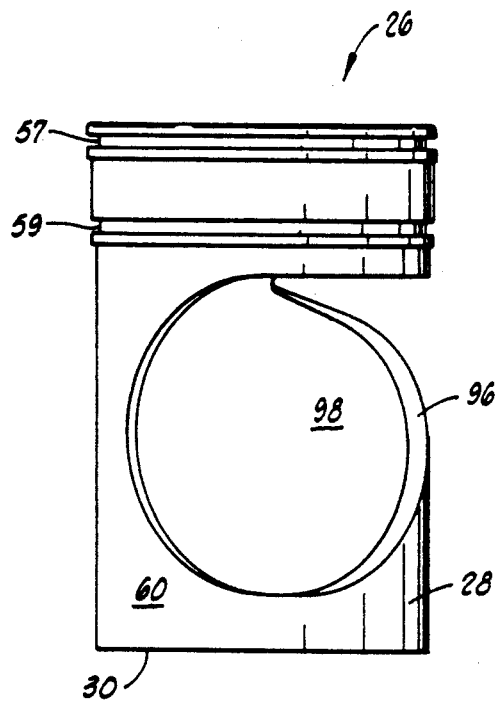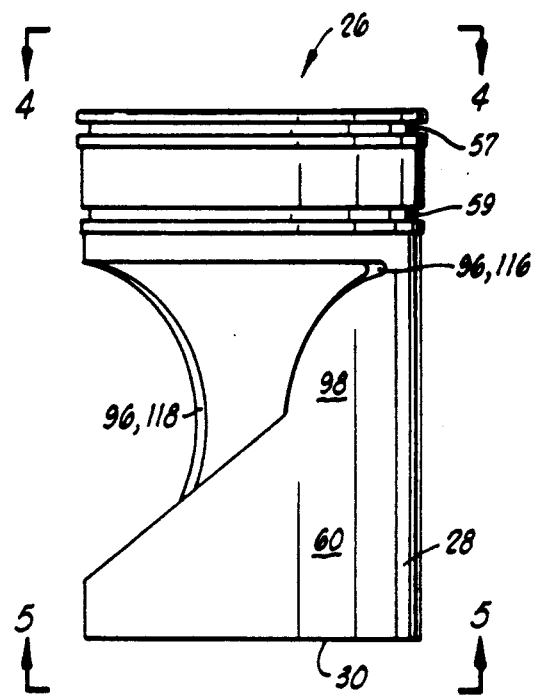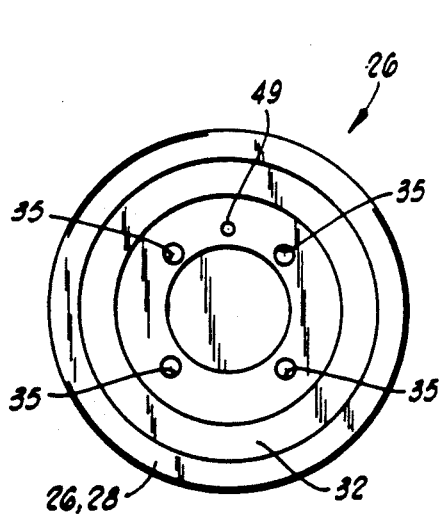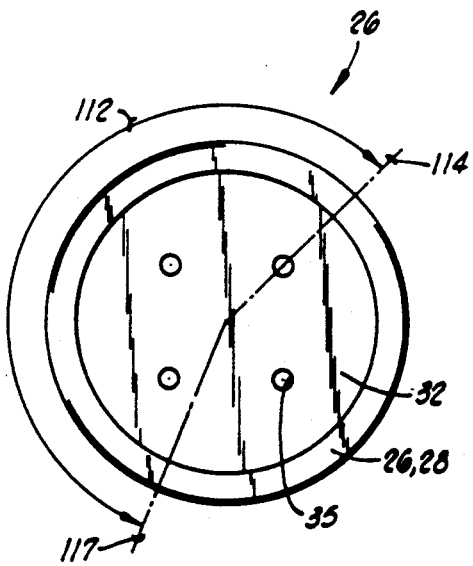

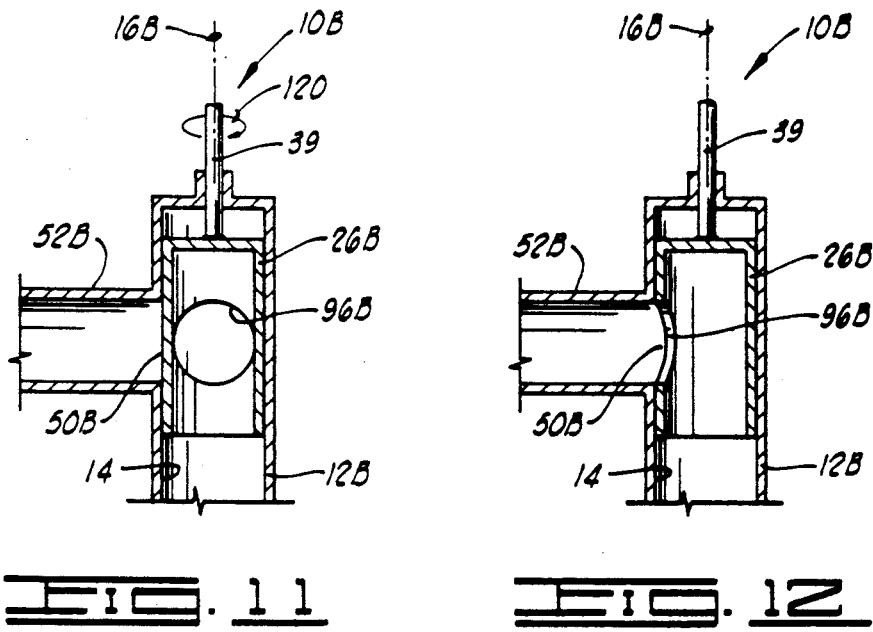
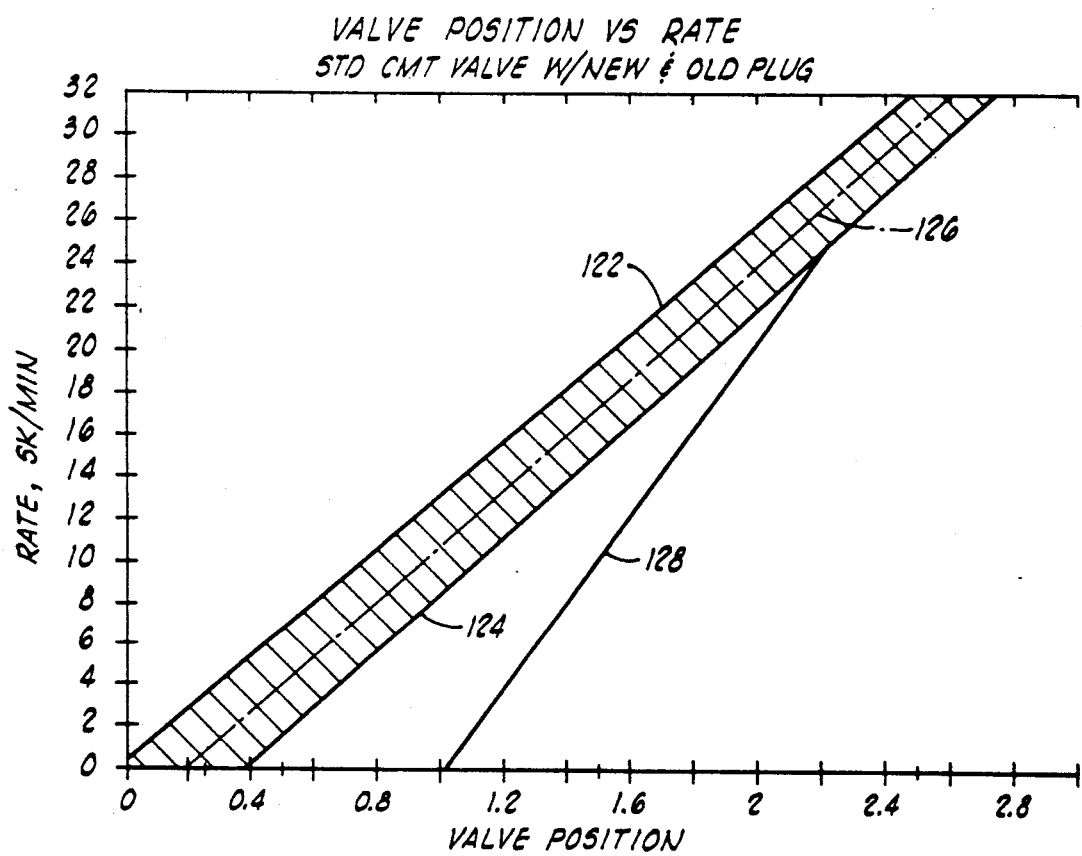

BULK CEMENT METERING DEVICE

BACKGROUND OF THE INVENTION

1. Field of the Invention

The present invention relates generally to apparatus and methods for metering of solid particulate materials, and more particularly, but not by way of limitation, to apparatus and methods for metering bulk cement to be mixed for cementing an oil or gas well.

2. Description of the Prior Art

During the cementing of an oil or gas well large volumes of cement must be mixed over a long interval of time while the cement is being pumped down into the well to cement a well casing into a bore hole. During this operation bulk dry cement is pneumatically conveyed from a bulk supply system through a cement metering device to a mixer such as a vertically oriented axial flow mixer.

The metering device previously used by the assignee of the present invention, Halliburton Services of Duncan, Okla., included a valve housing having a cylindrical valve bore with a rotary valve element disposed in the housing. The valve housing had a housing outlet located below the rotary valve element and had a lateral inlet opening. The rotatable valve element was designed such that as the valve element rotated from a closed position wherein the inlet opening was closed, the inlet opening would begin opening at the bottom of the opening and would increase the size of the bottom opening as the valve element was rotated toward a fully open position.

One difficulty which has been encountered with the abovedescribed device, and other available metering devices for bulk cement, is that during well cementing operations the metering device will tend to plug off during periods of low cement flow rates.

There is a need for an improved bulk cement metering device which can operate at relatively low flow rates without plugging off, and yet which retains the capability of handling the high flow rates of peak demand periods.

SUMMARY OF THE INVENTION

The present invention provides an improved bulk cement metering device and related methods of using the same for metering the flow of a stream of pneumatically conveyed dry particulate material such as cement.

The improved bulk cement metering device can generally be described as a valve apparatus. The valve apparatus includes a valve housing having a cylindrical inner housing bore with a vertically oriented longitudinal axis. The housing has a side wall with an inlet opening defined therein transverse to the longitudinal axis of the housing bore. The housing also has a housing outlet defined therein located below and coaxial with the longitudinal axis of the housing bore.

A cylindrical valve element is concentrically received in the cylindrical inner housing bore. The valve element is rotatable about the longitudinal axis of the valve bore relative to the valve housing.

The valve element has a first portion blocking the inlet opening when the valve element is in a first rotational position relative to the valve housing, which first position can be referred to as a fully closed position. The valve element has a circumferentially extending cutout means defined therein for progressively uncovering an increasing upper portion of the inlet opening as the valve element is rotated from said first position to a second position relative to the valve housing. The second position can be described as a fully open position.

Due to the fact that the valve element begins opening at the top, rather than the bottom, of the inlet opening, a greatly improved performance is provided at low flow rates.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 2 is an elevation view of the rotatable valve element of the apparatus of FIG. 1.

FIG. 3 is another elevation view of the valve element of FIG. 2, as viewed from the right side of FIG. 2.

FIG. 4 is a top plan view of the valve element of FIG. 3.

FIG. 5 is a bottom view of the valve element of FIG. 3.

FIG. 11 is a schematic plan sectioned view of a second alternative embodiment of the present invention, utilizing a rotating valve element which rotates about a generally horizontal axis and which has a cutout of the same shape and size as the inlet opening of the valve housing, namely a circular cutout. In FIG. 11, the apparatus is in a closed position.

FIG. 12 is another view of the second alternative embodiment of FIG. 11, showing the valve element in an open position.

FIG. 13 is a graphic illustration of the results of comparative testing between the improved device of FIGS. 1–8 as compared to a prior art device which uncovers the inlet opening from the bottom up.

DETAILED DESCRIPTION OF THE PREFERRED EMBODIMENTS

Figure 1:
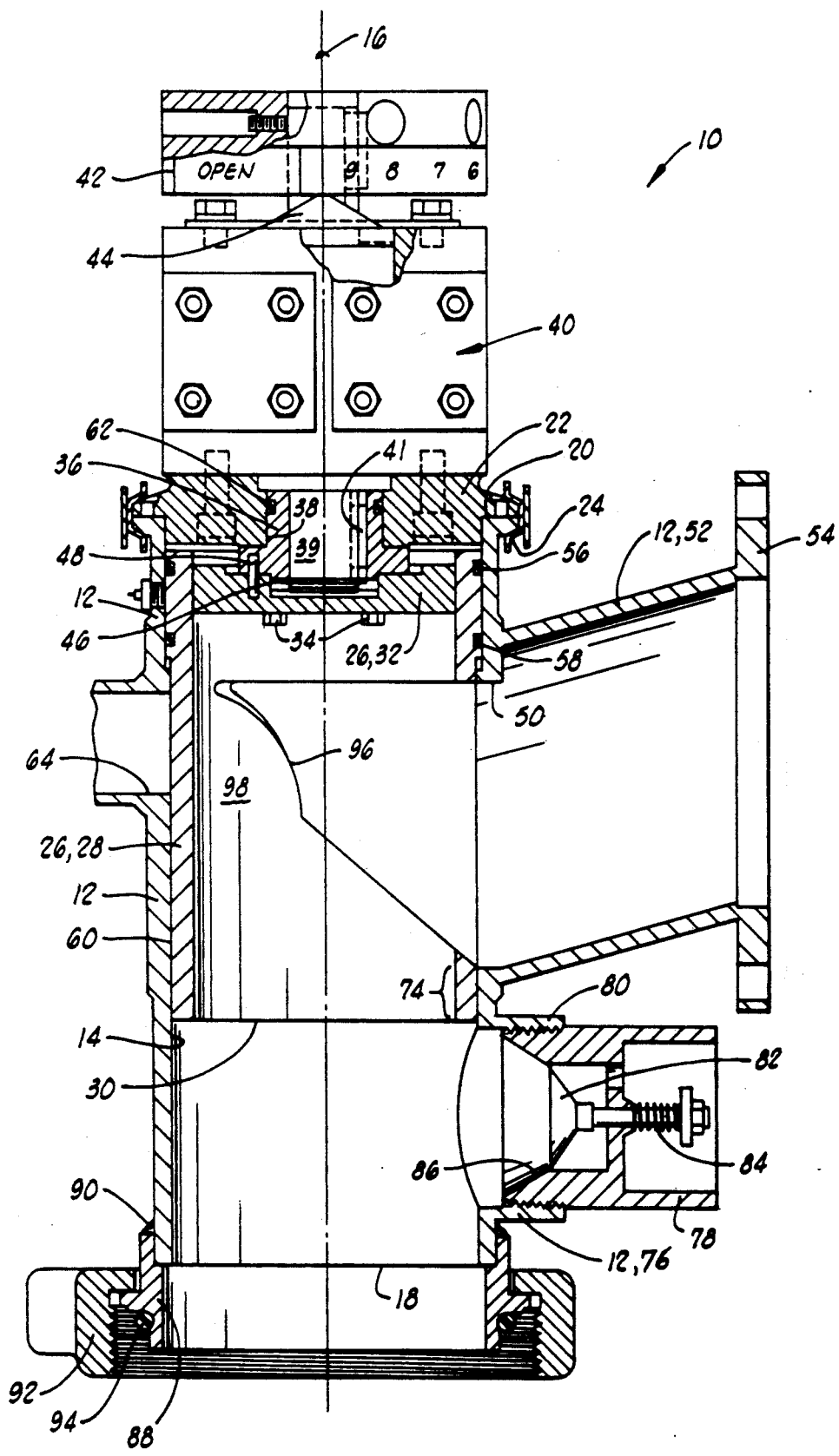
FIG. 1 is an elevation sectioned view of a bulk cement metering device or valve apparatus in accordance with the present invention.

Referring now to the drawings, and particularly to FIG. 1, the bulk cement metering device of the present invention is shown and generally designated by the numeral 10. The device 10 may also be generally referred to as a valve apparatus 10. The valve apparatus 10 includes a valve housing designated by the numeral 12. The valve housing 12 has a cylindrical valve housing bore 14 defined therein. The valve housing bore 14 has a vertically oriented longitudinal axis 16.

The valve housing 14 has an open lower end 18 which may also be referred to as a housing outlet 18.

Housing 14 has an upper end 20 which is closed by a valve bonnet 22. The upper end 20 of valve housing 14 and the valve bonnet 22 have coextensive radially outward extending outer flanges which are held together by an annular V-band 24.

A cylindrical rotatable valve element 26 is closely and rotatably received within the valve housing bore 14. The valve element 26 is comprised of a hollow cylindrical wall section 28 having an open bottom end 30 and having its upper end closed by an upper end bulk head 32.

The bulk head 32 is attached by a plurality of machine screws 34 to a rotatable adapter hub 36. Screws 34 extend through holes 35 (see FIG. 4) in bulk head 32. A pin 48 which fits through a flange of adapter hub 36 into pin hole 49 assures that the valve element 26 is properly oriented rotationally relative to adapter hub 36.

The adapter hub 36 extends into a bore 38 of valve bonnet 22. Adapter hub 36 is attached to a rotatable shaft 39 of an automatic valve actuator 40 by a square key 41. A retaining ring 46 holds adapter hub 36 in place upon shaft 39. Automatic valve actuator 40 will selectively rotate the adapter hub 36 and the attached valve element 26 to rotate the valve element 26 within valve housing 12 to open and close the valve apparatus 10.

The automatic valve actuator 40 is comprised of a rack and pinion rotary actuator. An indicator hub 42 rotates with the valve element 26. A fixed pointer 44 on the actuator 40 indicates the position of the valve element 26.

Valve housing 12 has a generally circular and laterally facing inlet opening 50 defined therein. An inlet pipe 52 of housing 12 leads to the inlet opening 50. Inlet pipe 52 has a bolted flange end connection 54.

In typical use of the apparatus 10, a flexible conduit from a bulk cement truck will be bolted to the flange 54.

As seen in FIG. 1, the inlet pipe 52 is sloped downward slightly toward the inlet opening 50. In general, however, the inlet pipe 52 can be described as being generally horizontally oriented. That is, the flow of the pneumatically conveyed stream of particulate material flowing toward inlet opening 50 is generally horizontal as opposed to being generally vertical.

First and second annular O-ring seals 56 and 58 seal between a cylindrical outer surface 60 of valve element 26 and the cylindrical valve housing bore 14 above the inlet opening 50. Seals 56 and 58 are received in grooves 57 and 59, respectively, of valve element 26 (see FIG. 2). These seals keep particulate material from entering the upper mechanical parts of the apparatus. A third O-ring seal 62 is disposed between adapter hub 36 and the bore 38 of valve bonnet 22.

Figures 7, 8:
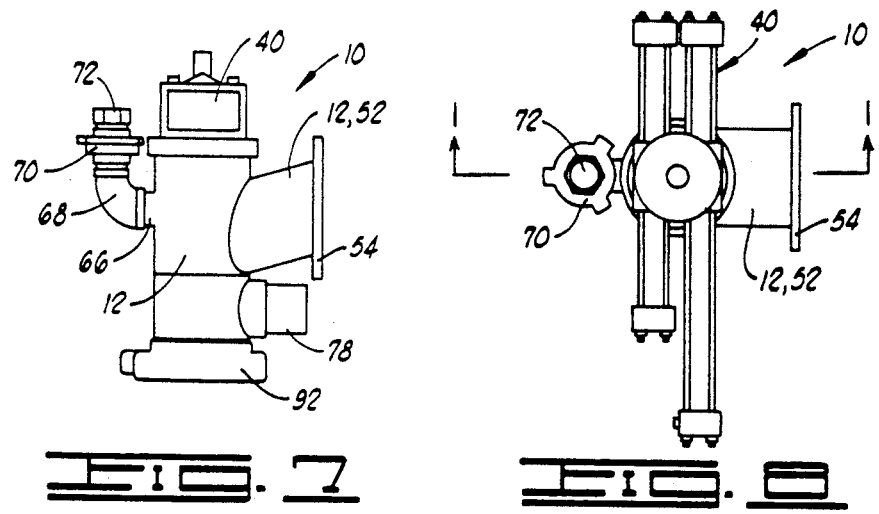
FIG. 7 is an elevation view of the metering device of FIG. 1.
FIG. 8 is a plan view of the metering device of FIG. 1. Line 1—1 shown on FIG. 8 illustrates the location of the cutaway or sectioned view of FIG. 1.

Valve housing 14 has a cleanout opening 64 defined therethrough in a position 180° opposite the inlet opening 50. As is best seen in FIG. 7, a nipple 66 extends outward from opening 64. An elbow 68 is connected to nipple 66 and has a coupling 70 thereon which is plugged by a bull plug 72. When it is desired to clean the apparatus 10, a washout line can be connected in place of bull plug 72 and high pressure water is directed through the apparatus 10 to clean the same.

A lowermost portion 74 of the cylindrical wall section 28 extends below inlet opening 50 and can be described as being circumferentially continuous, i.e., there are no openings in the lowermost portion 74.

Also formed in the housing 12 through a side wall thereof, and below the inlet opening 50 is an integral nipple 76 in which is received a vacuum breaker body 78. Vacuum breaker body 78 may be attached to nipple 76 by threads 80. A spring loaded poppet valve 82 is biased by spring 84 against a valve seat 86. The poppet 82 will move inwardly to allow inward air flow to break any vacuum which is created within the apparatus 10.

A male union half 88 is connected to the lower end of housing 12 by annular weld 90. A union wing nut 92 associated with male union half 88 is used to connect the apparatus 10 to a female union half in a known manner. An O-ring 94 is carried by male union half 88.

In a typical use of the apparatus 10, the male union half 88 is joined with a female union half which is fixed on the upper end of a vertical axis rotating screw mixer device (not shown). The need for reliable metering of the pneumatically conveyed dry cement material is critical to providing good density control in the downstream mixer.

The valve element 26 is rotatable between what can be described as a first position or fully closed position wherein the valve element 26 completely closes valve inlet opening 50, and a second position or fully open position wherein a cutout means 96 of valve element 26 completely uncovers the inlet opening 50. In this context the terms "first" and "second" are not used to indicate a temporal relationship, but simply to identify the two end positions.

In FIG. 1, the valve apparatus 10 is shown in its fully open position wherein the inlet opening 50 is completely uncovered. The valve element 26 can be rotated clockwise as viewed from above relative to housing 12 from the position of FIG. 1 toward its fully closed position. When the valve element 26 is rotated to its fully closed position, a portion 98 of the wall 28 of valve element 26 will be positioned so that the cylindrical outer surface 60 thereof will completely block the housing inlet opening 50.

Figure 6:
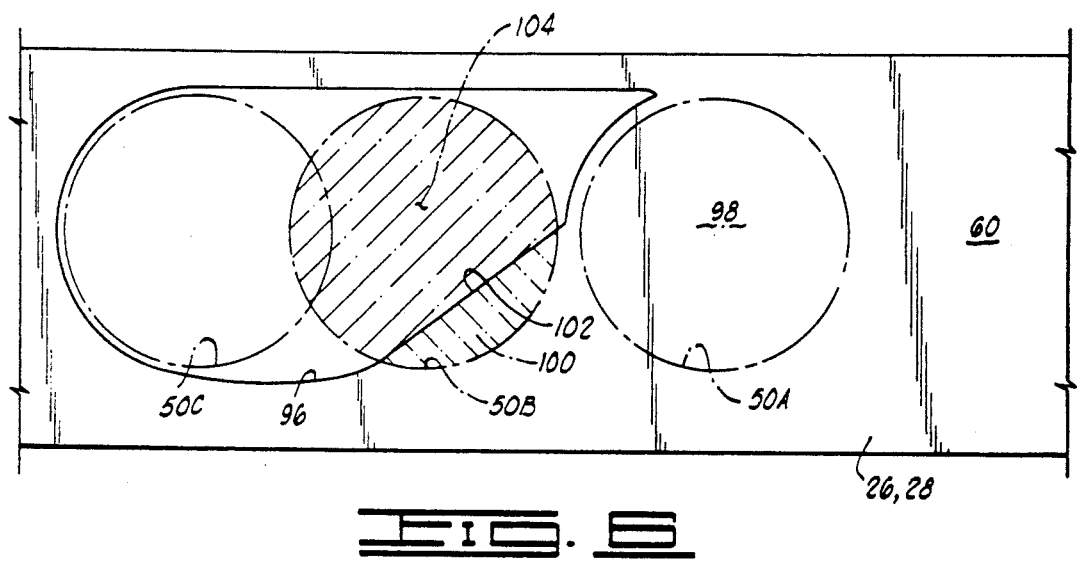
FIG. 6 is a rolled out view of the outer surface of the valve element of FIGS. 2 and 3 further illustrating the profile of the cutout.

The relationship between the cutout means 96 and the inlet opening 50 is best seen in FIG. 6 which is a schematic laid-out view of the cylindrical outer surface 60 of valve element 26 showing the entire profile of the cutout 96. Superimposed upon FIG. 6 are three phantom line representations of the inlet opening 50. The fully closed position of the apparatus 10 is designated by the phantom line position 50A in FIG. 6. In position 50A, the solid wall portion 98 of valve element 26 completely blocks the inlet opening 50.

The fully open position of valve element 26 as seen in FIG. 1, is represented in FIG. 6 by the phantom position 50C of the inlet opening.

An infinite number of intermediate positions between fully closed position 50A and fully open second position 50C are represented by the phantom line position 50B in FIG. 6.

It is seen that as the valve element 26 rotates from its fully closed position toward its fully open position, an upper portion of the inlet opening 50 beginning at about the ten o'clock position as seen in FIG. 6 will be uncovered. Further rotation of valve element 26 toward its fully open position progressively uncovers a larger and larger upper portion of the inlet opening 50. At an intermediate position such as position 50B, the valve element 26 can be described as defining a weir 100. In FIG. 6, the portion of the wall 28 of valve element 26 defining the weir 100 in intermediate position 50B has been shaded. The weir 100 has a top edge 102 which is sloped around a circumference of the valve element 26; that is the top edge 102 is not horizontal as viewed in FIG. 6.

With reference to FIG. 1, it will be seen that when the valve element 26 is in an intermediate position corresponding to position 50B of FIG. 6, the weir 100 will block a lower portion of the inlet pipe 52 corresponding to the shaded portion 100 seen in FIG. 6. This correspondingly defines an open flow channel 104 in an upper portion of the inlet pipe 52. In FIG. 6, the open flow channel 104 is shaded for purposes of illustration.

It is noted that the valve element 26 begins uncovering the inlet opening 50 at approximately the ten o'clock position, i.e., that is in the upper left quadrant thereof as seen in FIG. 6. Although this is not the very topmost portion of the inlet opening 50, it can be accurately described as an upper portion of the inlet opening 50. Further refinement of the invention could be achieved by mounting the apparatus 10 so that its longitudinal axis 16 is somewhat tilted from the vertical so that the portion of inlet opening 50 which is first uncovered will be at the very topmost portion of inlet opening 50.

The actual appearance of the cutout means 96 in the valve element 26 can be further understood in viewing the two elevation views of FIGS. 2 and 3. FIG. 2 is a view as would be seen looking toward the valve element 26 from the inlet opening 50 in the fully open position 50C. FIG. 3 is a view 90° counterclockwise as viewed from above from that of FIG. 2.

FIG. 4 is a top plan view as seen in FIG. 3. FIG. 5 is a bottom view as seen in FIG. 3, and the arc 112 represents the circumferential arc covered by the cutout means 96, with a radial line 114 representing the extremity 116 as noted in FIG. 3, and with the radial line 117 denoting the other circumferential extremity 118 of cutout means 96.

Operation of the Metering Device

I have discovered that the cause of the problem of plugging at low flow rates with prior art devices is due to the fact that at these low flow rates the solid particulate material falls out of the pneumatically conveyed stream and bridges across openings in the prior art metering devices. These prior art metering devices such as the prior art metering device used by the assignee of the present invention as described in the description of the prior art portion of this disclosure, begin uncovering the inlet opening from the bottom thereof. Thus, when the metering device is moved toward a closed position to reduce the flow rate therethrough, the solid particulate material which begins to fall from the stream piles up adjacent the relatively small uncovered portion of the inlet opening and thus can relatively easily bridge across that uncovered portion and plug the same.

The cement handling system must be designed to carry relatively high flow rates at peak demand. For example, during a typical cementing operation the necessary flow rate of bulk cement through the metering device may range from as low as two sacks per minute to as high as forty sacks per minute. A sack of cement typically has a ninety-four pound dry weight.

The cement handling system, and particularly the metering device, must be sized so that it can handle the maximum required flow rate, e.g., forty sacks per minute. The difficulty that is encountered is that when such a system is operated at relatively low flow rates, e.g., two sacks per minute, the metering device tends to plug off with dry cement material.

I have discovered that this plugging phenomena can be greatly reduced with the modified valve element 26 disclosed herein which begins uncovering the inlet opening at the upper portion rather than at a lower portion thereof. Thus, even at relatively low flow rates, the material falling from the pneumatically conveyed stream will merely pile up against the already covered lower portion of the inlet opening 50 and will not be prone to bridge across the uncovered upper portion of the inlet opening 50.

The design of the present invention allows bulk material to settle in the inlet pipe 52 leading up to the inlet opening 50. Settling occurs up to a point where equilibrium is reached between settling and increased flow velocity of the restricted area, i.e., that is through the open upper portion of inlet opening 50. This provides a passageway which is adjacent to the location of the valve opening 96 and thus an uninterrupted flow path through the entrance pipe 50 and valve opening 96.

This process of metering the pneumatically conveyed stream can be described as follows.

First, a metering valve housing having an outlet and a lateral inlet opening must be provided.

A pneumatically conveyed stream of particulate material must then be flowed in the lateral inlet opening and out the housing outlet.

This stream of pneumatically conveyed particulate material is metered as it flows through the inlet opening by raising and lowering the weir 100 and thereby blocking a variable lower portion of the inlet opening 50.

This metering of the flow of the pneumatically conveyed stream of particulate material through inlet opening 50 is accomplished by raising and lowering the weir 100 to block a variable lower portion of the inlet opening 50. This raising and lowering of the weir 100 is preferably accomplished by rotating the cylindrical valve element 26 about the longitudinal axis 16 of the valve element 26. The weir 100 is defined in the cylindrical wall 28 of valve element 26.

As the lower portion of the inlet opening 50 is blocked it allows particulate material to fall from the pneumatically conveyed stream in front of the weir 100 without blocking a flow path of the pneumatically conveyed stream over the top edge 102 of weir 100.

Figures 9, 10:
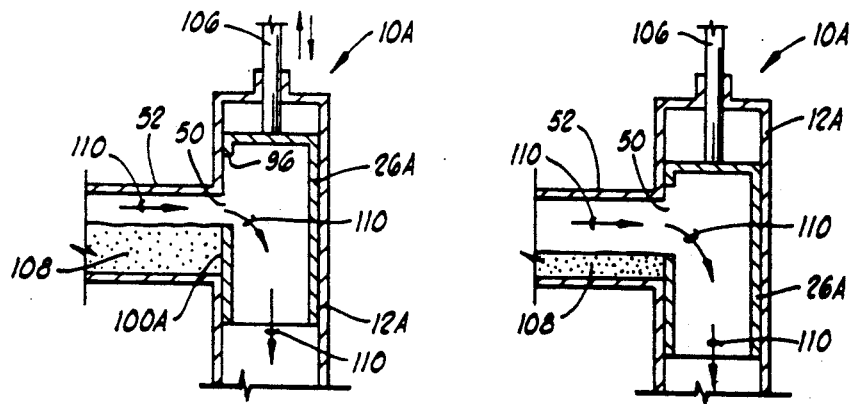
FIG. 9 is a schematic elevation sectioned view of an alternative embodiment of the present invention, utilizing a reciprocating valve element rather than a rotating valve element.
FIG. 10 is another view of the alternative embodiment of FIG. 9 showing the reciprocating valve element in a more open position as compared to FIG. 9.

Alternative Embodiment of FIGS. 9–10

FIGS. 9 and 10 schematically illustrate a first alternative embodiment of the invention generally designated by the numeral 10A.

In the alternative embodiment of FIGS. 9 and 10, those features analogous to the apparatus 10 previously described are designated by similar numerals using a suffix A. Identical features are identified by identical numerals without a suffix.

The apparatus 10A of FIGS. 9 and 10 utilizes a reciprocable valve element 26A rather than a rotatable valve element. A reciprocating shaft 106 moves up and down relative to the housing 12A to vertically reciprocate valve element 26A. The valve element 26A has a generally circular cutout 96A defined therein corresponding to the size and shape of the inlet opening 50 of housing 12A.

In FIG. 9, the shaft 106 and valve element 26A has begun to move downward from a fully closed position to a partially open position so that an upper portion of the inlet opening 50 is open and so that a lower portion of inlet opening 50 is closed by weir 100A.

In FIG. 10, the shaft 106 and valve element 26A have moved further downward to a more open, but still intermediate position increasing the size of the open upper portion of the opening 50. The buildup of solid particulate material which as fallen from the pneumatically conveyed stream upstream of the weir 100A is schematically represented as particulate material 108. The direction of flow of the pneumatically conveyed particulate stream is indicated by arrows 110.

In the alternative embodiment of FIGS. 9 and 10, the raising and lowering of weir 100A is accomplished by vertical reciprocation of the valve element 26A.

Alternative Embodiment of FIGS. 11-12

FIGS. 11 and 12 schematically illustrate a second alternative embodiment of the invention generally designated by the numeral 10B.

In the alternative embodiment of FIGS. 11 and 12, those features analogous to the apparatus 10 previously described are designated by similar numerals using a suffix B. Identical features are identified by identical numerals without a suffix.

The apparatus 10B of FIGS. 11 and 12 has a housing 12B with a generally horizontally oriented axis of rotation 16B. FIGS. 11 and 12 are plan sectioned views. Also, FIGS. 11 and 12 are schematic illustrations.

The apparatus 10B includes a rotating valve element 26B which rotates about the generally horizontal longitudinal axis 16B. Valve element 26B has a generally circular cutout 96B defined through a side wall thereof.

The inlet pipe 52B is also oriented generally horizontally, and it leads to inlet opening 50B which is generally circular as defined by the intersection of horizontal pipe element 52B with the cylindrical inner surface 14 of housing 12B. The apparatus 10B is shown in FIG. 11 in a closed position wherein the cutout 96B is not in registry with any portion of the inlet 50B.

To open the apparatus 10B, the shaft 39 connected to valve element 26B is rotated in the direction indicated by arrow 120 so that the cutout 96B will first come in registry with an upper portion of the circular inlet opening 50B.

FIG. 12 shows the apparatus 10B having been moved to a completely open position where the circular cutout 96B is in registry with the circular inlet 50B.

One advantage of orienting the longitudinal axis 16B generally horizontally, is that this will substantially reduce the height of the apparatus 10B as compared to either the apparatus 10 of FIG. 1 or the apparatus 10A of FIGS. 9-10. Also, the circular cutout 96B is easier to machine than the irregular shaped cutout 96 of FIG. 1, thus somewhat reducing manufacturing costs.

A vertically oriented device 10 as shown in FIG. 1, on the other hand, provides easier clean out since particulate material will fall out of the device.

Comparative Test Data Showing Improved Operation at Low Flow Rates

The improved operation of the apparatus 10 has been shown as compared to prior art apparatus similar in all respects except that the prior art apparatus begins uncovering the lower portion of the inlet opening rather than the upper portion. These tests have shown very substantial improvements in the operation of the valve of the present invention as compared to the prior art device.

Most particularly, these improvements show that the modified device of the present invention does not plug off at low flow rates, and has much greater repeatability of flow rate for a given valve position at these relatively low flow rates.

As previously described, the apparatus 10 has an indicator hub 42 with a pointer 44 providing numerical indications from 0 through 9 indicating the relative position of the valve, with 0 being closed and with a fully open position following the numerical position 9.

At relatively low flow rates corresponding to numerical positions of approximately 2.1 and below, the prior art apparatus is erratic in its operation. The actual flow rates vary over a relatively wide range for a given valve position, and there is an increasing tendency to plug off the valve at lower flow rates.

The modified valve element of the present invention, which opens at the upper portion of the housing inlet, on the other hand, shows greatly improved results. Repeatability is improved throughout the entire lower range of valve positions such that a flow rate can be predicted from a given valve position to within plus or minus two sacks per minute (sk/min). During these tests bridging of the modified apparatus 10 only occurred once while metering at 2.5 sk/min. A flow rate of 2.5 sk/min corresponds to the lowest rate at which the apparatus 10 would normally be operated.

The modified valve 10 greatly improves the repeatability of the valve at metering rates up to about 18 sk/min. At metering rates above 18 sk/min, both the modified valve and the prior art valve perform satisfactorily. The difficulties with plugging and unpredictability of the prior art valve occurred only at the lower metering rates in the general range from 2.5 to 18 sk/min.

The results of the comparative tests are shown in FIG. 13 which is a graphical representation of flow rate in sk/min on the vertical axis versus valve position as represented by position indicator 42 on the horizontal axis.

The test data for the valve element 10 of FIG. 1 falls within the range of the shaded area indicated in FIG. 13 which lies between an upper boundary line 122 and a lower boundary line 124. The predicted flow rate for valve 10 of FIG. 1 can generally be expected to fall along the nominal flow rate line 126 indicated in phantom lines plus or minus two sk/min.

The prior art valve which is similar except that it begins opening at the bottom rather than the top of the inlet opening 50 has a much wider range which includes the shaded area plus the triangular shaped area between line 124 and a lower limit line 128 for the prior art valve. As is apparent, at valve positions below approximately 2.1, a much wider range of flow rates is likely to result from the prior art valve. For example, at a valve position of 1, the prior art device has a possible flow rate anywhere from zero to thirteen sk/min which corresponds to a plus or minus 6.5 sk/min accuracy for any possible predicted nominal value for the prior art device.

The prior art valve structure used in these tests corresponds to that shown in Exhibit A submitted with the INFORMATION DISCLOSURE STATEMENT filed concurrently herewith.

The data represented in FIG. 13 is for the device of the present invention as compared to the prior art device operating under similar conditions. In summary, the repeatability of the valve of the present invention while operating under constant conditions will be nominally plus or minus two sk/min for a given valve position, with the nominal predicted flow rate being that shown by line 126. The actual flow rate obtained under any given operating conditions will be affected by several factors. These include changes in supply pressure. Also, variations will be encountered during the tank delivery process due to transient conditions during startup and during the final emptying of a tank. Another factor is the physical characteristics of the actual material being delivered. Another factor is the condition of the system including buildup of cement in various portions of the system.

Thus it is seen that the apparatus and methods of the present invention readily achieve the ends and advantages mentioned as well as those inherent therein. While certain preferred embodiments have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. A valve apparatus for controlling flow of particulate material, comprising:
   a valve housing having a cylindrical inner housing bore with a longitudinal axis, said housing having a side wall with an inlet opening defined therein transverse to said longitudinal axis, and said housing having a downwardly open housing outlet defined therein; and
   a cylindrical valve element concentrically received in said cylindrical inner housing bore, said cylindrical valve element being rotatable about said longitudinal axis relative to said valve housing, said valve element having a first portion blocking said inlet opening when said valve element is in a first rotational position relative to said valve housing, and said valve element having a circumferentially extending cutout means having a greater circumferential extension than said inlet opening defined therein for progressively uncovering an increasing upper portion of said inlet opening as said valve element is rotated from said first position toward a second position relative to said valve housing, said valve element being hollow and having an open bottom located above said housing outlet so that said particulate material may drop through said open bottom of said valve element and out said housing outlet.

2. The apparatus of claim 1, wherein:
   said first portion of said valve element completely blocks said inlet opening when said valve element is in said first position relative to said valve housing.

3. The apparatus of claim 1, wherein:
   said cutout means completely uncovers said inlet opening when said valve element is in said second position relative to said valve housing.

4. The apparatus of claim 1, wherein:
   said cylindrical valve element has a circumferentially continuous portion located between said inlet opening and said housing outlet.

5. The apparatus of claim 1, wherein:
   said cutout means is shaped such that at intermediate rotational positions of said valve element between said first and second positions said valve element defines a weir covering a lower portion of said inlet opening with an upper portion of said inlet opening above said weir being completely open, said weir having a top edge sloped around a circumference of said valve element.

6. The apparatus of claim 5, further comprising:
   a generally horizontally oriented inlet pipe leading to said inlet opening, said weir blocking a lower portion of said inlet pipe to define an open flow channel in an upper portion of said inlet pipe.

7. The apparatus of claim 6, wherein:
   at least a portion of said inlet pipe is integrally formed with said valve housing.

8. The apparatus of claim 1, wherein:
   said first portion of said valve element completely blocks said inlet opening when said valve element is in said first position relative to said valve housing;
   said cutout means completely uncovers said inlet opening when said valve element is in said second position relative to said valve housing; and
   said cutout means is shaped such that at intermediate rotational positions of said valve element between said first and second positions said valve element defines a weir covering a lower portion of said inlet opening with an upper portion of said inlet opening above said weir being completely open.

9. The apparatus of claim 1, wherein:
   said longitudinal axis of said housing is generally vertically oriented.

10. A method of metering a pneumatically conveyed stream of particulate material comprising:
    (a) providing a metering housing having a downwardly open housing outlet and having a lateral inlet opening;
    (b) flowing said pneumatically conveyed stream of particulate material in said lateral inlet opening and out said housing outlet; and
    (c) metering flow of said pneumatically conveyed stream of particulate material through said inlet opening by raising and lowering a weir and thereby blocking a variable lower portion of said inlet opening, while leaving an upper portion of said inlet opening above said weir completely open.

11. The method of claim 10, wherein:
    in step (c), said raising and lowering is accomplished by rotating a cylindrical valve element about a longitudinal axis of said valve element, said weir being a portion of a cylindrical wall of said valve element.

12. The method of claim 11, wherein:
    said longitudinal axis of said valve element is oriented vertically.

13. The method of claim 10, wherein:
    said blocking of said variable lower portion of said inlet opening allows particulate material to fall from said pneumatically conveyed stream upstream of said weir without blocking a flow path of said stream over said weir.

14. The method of claim 10, wherein said particulate material is cement.

15. The method of claim 10, wherein:
    said step (b) includes flowing said stream through a generally horizontally oriented inlet conduit leading to said inlet opening.

16. The method of claim 10, wherein:
    in step (c), said raising and lowering is accomplished by vertically reciprocating a valve element.

* * * * *